(12) United States Patent
Andres

(10) Patent No.: US 7,539,568 B2
(45) Date of Patent: May 26, 2009

(54) CRASH PULSE ENERGY ALGORITHM FOR AN INFLATABLE RESTRAINT SYSTEM

(75) Inventor: Robert M. Andres, Troy, MI (US)

(73) Assignee: Continental Automotive Systems US, Inc, Auburn Hills, MI (US)

( * ) Notice: Subject to any disclaimer, the term of this patent is extended or adjusted under 35 U.S.C. 154(b) by 696 days.

(21) Appl. No.: 10/396,649

(22) Filed: Mar. 25, 2003

(65) Prior Publication Data
US 2003/0222441 A1 Dec. 4, 2003

Related U.S. Application Data

(60) Provisional application No. 60/385,379, filed on Jun. 3, 2002.

(51) Int. Cl.
*B60R 22/00* (2006.01)
(52) U.S. Cl. .............. 701/45; 701/46; 701/47; 180/282; 280/728.1
(58) Field of Classification Search ............ 701/45–47; 180/268, 271, 282, 734; 280/734, 728.1; 340/436, 903, 438, 286.01
See application file for complete search history.

(56) References Cited

U.S. PATENT DOCUMENTS

| | | | | |
|---|---|---|---|---|
| 5,157,268 A * | 10/1992 | Spies et al. ................ 307/10.1 |
| 5,282,134 A * | 1/1994 | Gioutsos et al. ............... 701/45 |
| 5,348,343 A | 9/1994 | Hawthorn |
| 5,418,723 A | 5/1995 | Reichelt et al. |
| 5,430,649 A | 7/1995 | Cashler et al. |
| 5,490,066 A | 2/1996 | Gioutsos et al. |
| 5,538,099 A * | 7/1996 | Blackburn et al. .......... 180/282 |
| 5,808,197 A * | 9/1998 | Dao ........................ 73/514.09 |
| 5,924,721 A | 7/1999 | Nakamura et al. |
| 5,969,599 A | 10/1999 | Wessels et al. |
| 6,045,151 A | 4/2000 | Wu |
| 6,076,028 A * | 6/2000 | Donnelly et al. .............. 701/45 |
| 6,109,648 A | 8/2000 | Luo et al. |
| 6,149,190 A * | 11/2000 | Galvin et al. ............... 280/735 |
| 6,199,874 B1 * | 3/2001 | Galvin et al. ............ 280/5.514 |
| 6,218,924 B1 | 4/2001 | Zabler et al. |
| 6,254,130 B1 | 7/2001 | Jayaraman et al. |
| 6,373,146 B2 * | 4/2002 | Horikoshi et al. .......... 307/10.1 |

(Continued)

FOREIGN PATENT DOCUMENTS

DE          10108848 A1     8/2000

(Continued)

OTHER PUBLICATIONS

A new decision making algorithm for airbag control; Mahmud, S.M.; Alrabady, A.I.; Vehicular Technology, IEEE Transactions on vol. 44, Issue 3, Aug. 1995 pp. 690-697; Digital Object Identifier 10.1109/25.406638.*

(Continued)

*Primary Examiner*—Cuong H Nguyen

(57) ABSTRACT

An air bag system (12) includes a controller (14), a remote satellite sensor (16), and a deployable air bag (18). Controller logic for deployment discrimination of an impact event sensitizes an airbag deployment command in response to signals from the satellite sensor. The logic determines a crash-pulse energy term (CPE) which discriminates impact signals which are particularly useful for identifying side impact events.

17 Claims, 4 Drawing Sheets

U.S. PATENT DOCUMENTS

| | | | |
|---|---|---|---|
| 6,409,213 | B2 | 6/2002 | Webber et al. |
| 6,426,567 | B2 * | 7/2002 | Ugusa et al. ............... 307/10.1 |
| 6,465,907 | B2 * | 10/2002 | Ueno et al. ................ 307/10.1 |
| 6,512,969 | B1 * | 1/2003 | Wang .......................... 701/45 |
| 6,529,811 | B2 * | 3/2003 | Watson et al. ................. 701/45 |
| 6,559,557 | B2 * | 5/2003 | Manlove et al. ............ 307/10.1 |
| 6,560,519 | B2 * | 5/2003 | Williams et al. .............. 701/45 |
| 6,584,386 | B2 * | 6/2003 | Feser et al. ................... 701/45 |
| 6,694,225 | B2 * | 2/2004 | Aga et al. ....................... 701/1 |
| 2002/0013648 | A1 * | 1/2002 | Feser et al. ................... 701/45 |
| 2002/0087235 | A1 * | 7/2002 | Aga et al. ....................... 701/1 |
| 2002/0152012 | A1 * | 10/2002 | Watson et al. ................. 701/45 |
| 2003/0004627 | A1 * | 1/2003 | Williams et al. .............. 701/45 |

FOREIGN PATENT DOCUMENTS

| | | |
|---|---|---|
| DE | 10108848 | 9/2001 |
| DE | 69634847 T2 * | 6/2006 |
| DE | 102005033937 A1 * | 2/2007 |
| KR | 747399 B1 * | 8/2007 |
| WO | WO 0013944 A1 * | 3/2000 |
| WO | WO 03/101786 | 12/2003 |

OTHER PUBLICATIONS

A codesign approach for safety-critical automotive applications; von Hanxleden, R.; Botorabi, A.; Kupczyk, S.; Micro, IEEE vol. 18, Issue 5, Sep.-Oct. 1998 pp. 66-79; Digital Object Identifier 10.1109/40.735945.*

Vehicular air-bag control based on energy, momentum, and semimetric spaces; Barnard, R.; Riesner, M.; Vehicular Technology, IEEE Transactions on; vol. 49, Issue 5, Sep. 2000 pp. 1641-1649; Digital Object Identifier 10.1109/25.892548.*

A treatise on crash sensing for automotive air bag systems; Ching-Yao Chan; Mechatronics, IEEE/ASME Transactions on vol. 7, Issue 2, Jun. 2002 pp. 220-234; Digital Object Identifier 10.1109/TMECH.2002.1011259.*

On the detection of vehicular crashes-system characteristics and architecture; Ching-Yao Chan; Vehicular Technology, IEEE Transactions on; vol. 51, Issue 1, Jan. 2002 pp. 180-193; Digital Object Identifier 10.1109/25.992078.*

Microsensor engineering; Osburn, C.M.; Designing Low Power Digital Systems, Emerging Technologies (1996); 1996 pp. 233-328; Digital Object Identifier 10.1109/ETLPDS.1996.508875.*

Advanced passive safety system via prediction and sensor fusion; Watanabe, K.; Umezawa, Y.; Abe, K.; Vehicle Navigation and Information Systems Conference, 1994. Proceedings., 1994; Aug. 31-Sep. 2, 1994 pp. 435-440; Digital Object Identifier 10.1109/VNIS.1994.396799.*

Electrostatic servo system for multi-axis accelerometers; Jono, K.; Hashimoto, M.; Esashi, M.; Micro Electro Mechanical Systems, 1994, MEMS '94, Proceedings, IEEE Workshop on; Jan. 25-28, 1994 pp. 251-256; Digital Object Identifier 10.1109/MEMSYS.1994.555762.*

Precrash Dipping Nose (PCDN) Needs Pedestrian Recognition; Jung, H. G.; Kwak, B. M.; Shim, J. S.; Yoon, P J.; Kim, J.; Intelligent Transportation Systems, IEEE Transactions on, vol. 9, Issue 4, Dec. 2008 pp. 678-687 Digital Object Identifier 10.1109/TITS.2008.2006789.*

State Estimator Design for Real-time Controlled Restraint Systems; van der Laan, E.; Veldpaus, F.; van Schie, C.; Steinbuch, M.; American Control Conference, 2007. ACC '07, Jul. 9-13, 2007 pp. 242-247; Digital Object Identifier 10.1109/ACC.2007.4282870.*

Crashworthiness design of HSGGT vehicles; Galganski, R.A.; Railroad Conference, 1993., Proceedings of the 1993 IEEE/ASME Joint, Apr. 6-8, 1993 pp. 121-130; Digital Object Identifier 10.1109/RRCON.1993.292954.*

International Search Report, Jul. 9, 2003.

* cited by examiner

```
// Find the new significant maximum
If ((L1_ACCEL > L1_MAX) AND (L1_ACCEL > ROW1_MAX_MIN) AND (L1_ACCEL >
     (L1_MIN + ROW1_PEAK_DIFF)))
{
        L1_MAX = L1_ACCEL;
        L1_MAX_TIM = L1_RUN_TIM;

// Calculate CPE for use in low-speed thresh
        if ((L1_PREV_MAX) AND ((L1_MAX > L1_PREV_MAX) OR
                ((L1_MAX - L1_MIN) > L1_PREV_MAX)) AND
                ((L1_MAX_TIM - L1_PREV_MAX_TIM) < ROW1_MAX_TIM_LIM)
                AND (L1_CPE < ROW1_CPE_MAX_CNT))
                L1_CPE = L1_CPE + 1;
}
// Qualify the maximum if first max is valid and a sufficient peak difference is achieved
If ((L1_MAX) AND (L1_ACCEL < (L1_MAX - ROW1_PEAK_DIFF)))
{
        L1_PREV_MAX_TIM = L1_MAX_TIM;      // Store old max level and time
        L1_PREV_MAX = L1_MAX;
        L1_MAX = 0;                         // clear max variables to allow next max to be found
        L1_MAX_TIM = 0;
        L1_MIN = L1_ACCEL;
}
// Find the new minimum
If ((L1_ACCEL < L1_MIN) AND (L1_PREV_MAX))
{
        L1_MIN = L1_ACCEL;

temp = (L1_PREV_MAX*ROW1_MIN_LIM) > >0x08;

// Limit L1_MIN for CPE calculation
        if (L1_MIN < -(temp)
                L1_MIN = -(temp);}
```

*Fig-2*

| Variable | Description | Usage | Data type |
|---|---|---|---|
| ROW1_MAX_TIM_LIM | Time limit for two consecutive maximums to have an effect on CPE. Limits the effect to pulses that are close together in time. | Parameter | Byte |
| ROW1_PEAK_D1FF | Minimum reversal needed to qualify a local maximum or minimum. Large peak differences are indicative of breaking structure associated with severe crashes. | Parameter | Byte |
| ROW1_MAX_MIN | Minimum level needed to qualify a maximum. This is used to prevent small bumps and noise from affecting CPE | Parameter | Byte |
| ROW1_MIN_LIM | Limit the range of local minimum as a percentage of the previous maximum. This prevents abuse-type signals with large oscillations from affecting the CPE | Parameter | Byte |
| ROW1_CPE_MAX_CNT | Maximum allowable Cpe value. It is helpful to limit the amount of effect the CPE has on the threshold | Parameter | Byte |
| L1_ACCEL | Acceleration value from left-first row satellite | Variable | Signed Byte |
| L1_RUN_TIM | A timer that increments every loop. This is used to measure the time between two significant peaks. | Variable | Integer |
| L1_MAX | Left-front satellite current local maximum | Variable | Byte |
| L1_MAX_TIM | Time of Left-front satellite current local maximum | Variable | Byte |
| L1_PREV_MAX | Left-front satellite previous local maximum | Variable | Byte |
| L1_PREV_MAX_TIM | Time of Left-front satellite previous local maximum | Variable | Byte |
| L1_MIN | Left-front satellite current local minimum | Variable | Signed Byte |
| Temp | Temporary storage for calculation | Variable | Integer |
| L1_CPE | Left-front satellite crash pulse energy | Variable | Byte |

*Fig-3*

CRASH PULSE ENERGY ALGORITHM FOR AN INFLATABLE RESTRAINT SYSTEM

The present application claims priority to U.S. Provisional Patent Application Ser. No. 60/385,379, filed 3 Jun. 2002.

BACKGROUND OF THE INVENTION

The present invention relates to an inflatable restraint system, and more particularly to an algorithm which discriminates a must-deploy side impact event for a side air bag system.

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

A conventional supplemental inflatable restraint often includes a side impact air bag installed inside a vehicle seat or inner portion of a vehicle door. When a side impact is detected, gas is instantaneously blown out from the gas generating device into the bag so that the bag is inflated between the side of the vehicle and the passenger. With the bag disposed between the side of the vehicle and the passenger in the vehicle, the shock applied to the passenger caused by the deformed door and the like is absorbed by the bag to protect the passenger.

In conventional side impact air bag system, the bag inflates in a direction substantially perpendicular to an input of side impact when the side impact occurs, therefore, the air bag is required to be instantly inflated with a high pressure in order to positively inflate the bag in a narrow space between the vehicle door and the passenger.

Discrimination of a must-deploy side impact event from other non-deploy events and abuse events may be difficult with acceleration-based crash sensors. The task may be further complicated due to the aggressive deploy times required for side impact events.

Accordingly, it is desirable to provide an air bag system which effectively discriminates a must-deploy side impact event.

SUMMARY OF THE INVENTION

The air bag system according to the present invention includes a controller, a remote satellite sensor, and a deployable air bag. Controller logic for deployment discrimination of an impact event sensitizes an airbag deployment command in response to signals from the satellite sensor. The logic determines a crash-pulse energy term (CPE) which discriminates impact signals that exhibit an increasing amplitude or energy between two consecutive pulses. Discrimination of such impact signals is particularly useful for side impacts.

The CPE is utilized in combination with other inputs to determine a deploy command. That is, the CPE sensitizes a deploy threshold for an impact event which may otherwise not meet the deploy threshold. For example, the CPE term may be multiplied by a weighting factor and added to a deployment-threshold to make the air bag more likely to deploy under certain circumstances and thereby improve discrimination of an impact.

The present invention, therefore, provides an air bag system which effectively discriminates a must-deploy side impact event.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 provides pseudo code for deployment discrimination logic of an impact event;

FIG. 3 is a variable chart for the pseudo code of FIG. 2; and

DETAILED DESCRIPTION OF THE PREFERRED EMBODIMENT

Figure 1:
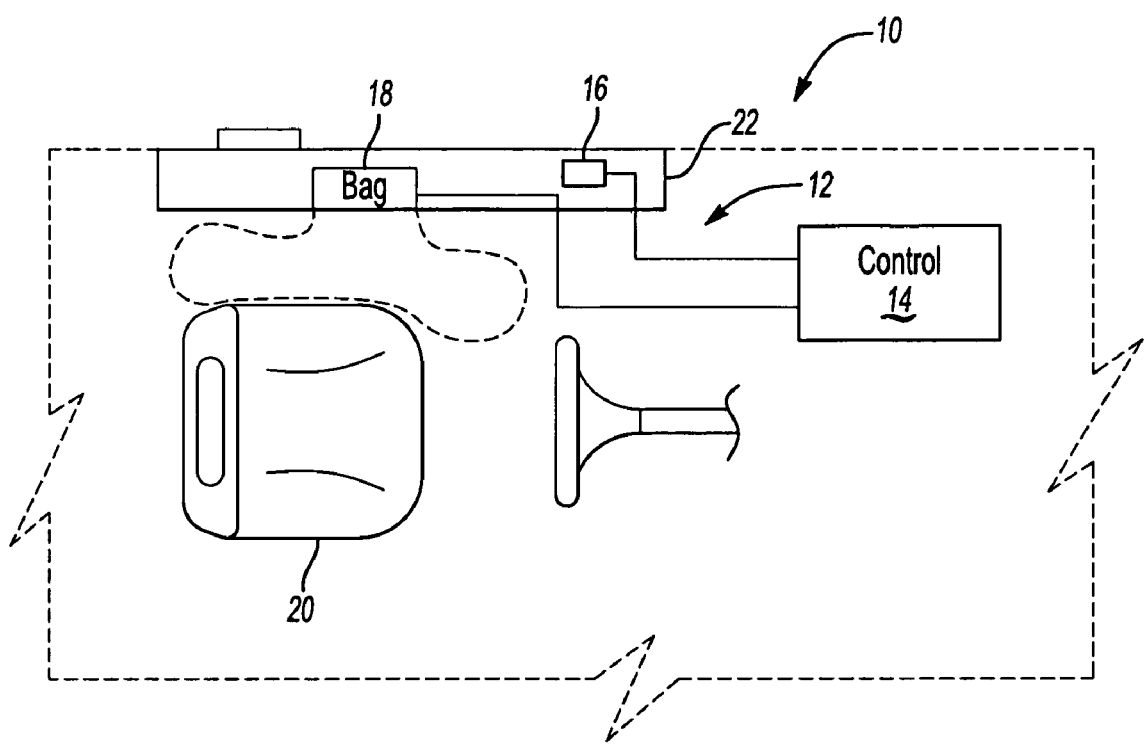
FIG. 1 is a schematic view of an exemplary vehicle embodiment for use with the present invention.

FIG. 1 illustrates a general schematic view of a vehicle 10 having an air bag system 12. The air bag system 12 generally includes a controller 14, a remote satellite sensor 16 and a deployable air bag 18. Preferably, the air bag 18 is a side air bag located to the side of a vehicle seat 20. It should be understood that other air bag arrangements and sensor locations will likewise benefit from the present invention.

The satellite sensor 16 communicates with the controller 14 to sense a deploy event such as a side impact. In response to acceleration signals issued by the satellite sensor 16 the controller 14 determines whether to deploy the air bag 18 through logic stored in the controller 14. The satellite sensor 16 is preferably located in the side 22 of the vehicle 10 adjacent the related air bag 18. Other locations and sensor suites will also benefit from the present invention.

Figure 4:
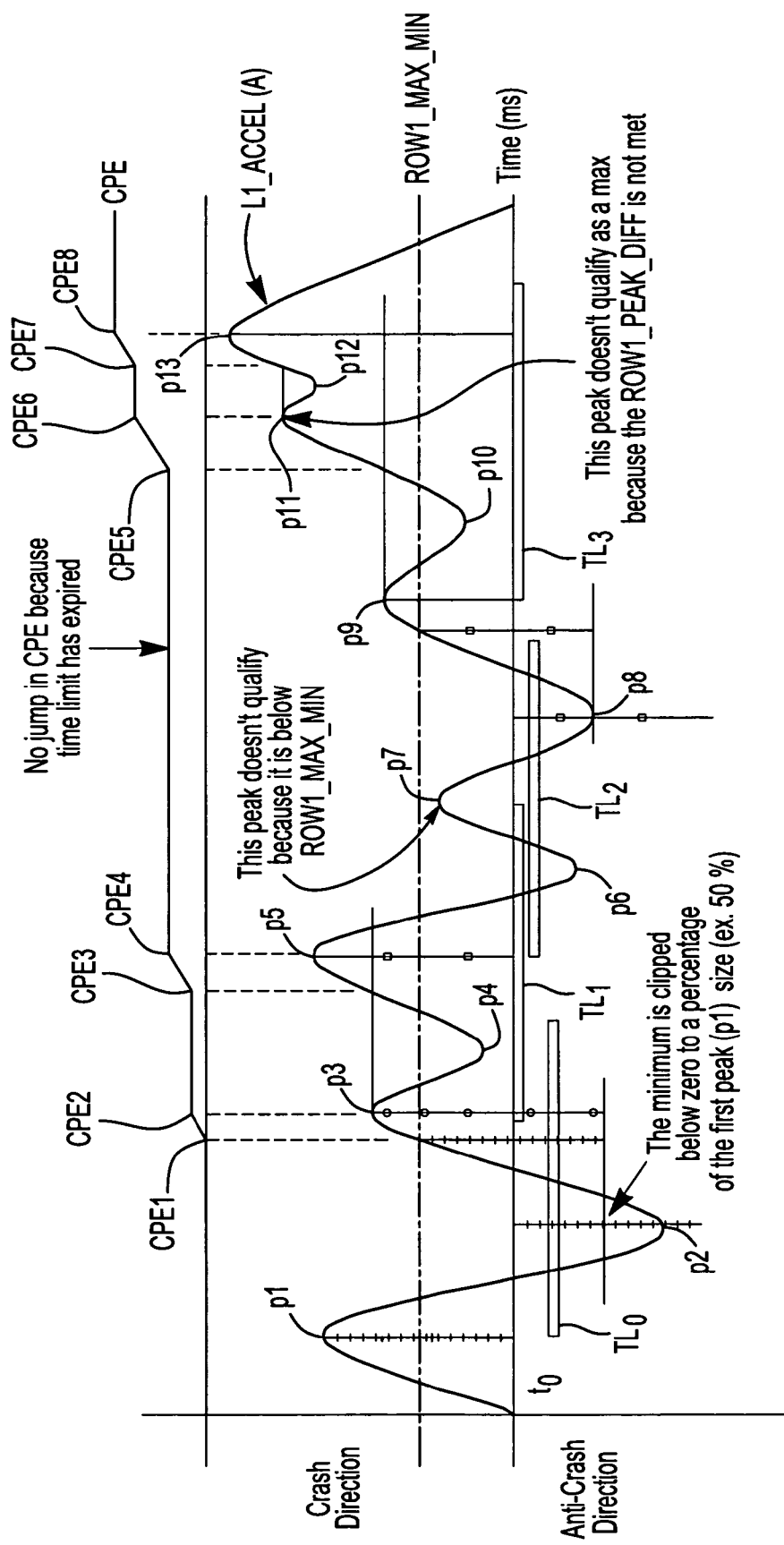
FIG. 4 is a graphical representation of an acceleration signal and a calculate increase in CPE according to the logic of the present invention.

Referring to FIG. 2, pseudo code for deployment discrimination of an impact event is provided. The pseudo code represents logic stored within the controller 14 for deployment of the air bag 18 in response to signals from the satellite sensor 16. The variables utilized within the pseudo code are delineated in the chart of FIG. 3 for a left-front satellite where L1 denotes "left side first row" and ROW1 denotes "first row". Generally, the logic determines a crash-pulse energy term (CPE; FIG. 4), which discriminates impact signals that exhibit an increasing amplitude or energy between two consecutive pulses. Discrimination of such impact signals is particularly useful for side impacts.

The CPE is preferably utilized in combination with other calculations and/or inputs to determine a deploy threshold. That is, the CPE sensitizes a deploy threshold for an impact event which may otherwise not meet the deploy threshold. That is, an unsensitized deploy threshold command may not deploy the airbag. Conventional deploy threshold logic may therefore alternatively or additionally be utilized with the present invention. For example, the CPE term may be multiplied by a weighting factor and added to a deployment-threshold to make the air bag 18 more likely to deploy under certain circumstances.

Referring to FIG. 4, a graphical representation of an acceleration signal A from the L1 satellite sensor 16 in which the crash direction is positive. The increase in the CPE term is further represented above the acceleration signal A as determined by the pseudo code (FIG. 2).

Side impacts with significant intrusion, such as vehicle side contact with a rigid object maybe severe and could be harmful to occupants. Discrimination of a side impact may be difficult for conventional air bag systems as the intrusion of a rigid object through soft sheet metal such as a vehicle door may not generate a large signal to the accelerometer sensors unless the intruding object directly strikes them. Therefore, it becomes necessary to examine the shape of the pulse rather than just the size. This CPE term calculated by the logic of the present invention discriminates side impacts with high levels of intrusion.

The logic of the present invention determines the level and time of the last two significant maximum acceleration peaks and the level of the minimum in between for effective discrimination. The logic of the present invention specifically identifies consecutive peaks that are close together and have increasing amplitude or energy as such relationships are indicative of an impact with significant intrusion.

At an initial time t0 the satellite sensor 16 receives an acceleration peak p1. The peak p1 is in the crash direction and exceeds the ROW1_MAX_MIN level to qualify for a minimum significant level. Peak p1 initiates a time limit ROW1_MAX_TIM_LIM ($TL_0$). The ROW1_MAX_MIN level prevents minor debris impacts, bumps, background noise and the like from affecting CPE.

Acceleration peak p2 is in the anti-crash direction as typical of a reflection from peak p1. Large peak differences are indicative of breaking structure associated with severe crashes. Acceleration peak p2 is significant in that it exceeds a difference ROW1_PEAK_DIFF which provides the minimum reversal necessary to qualify the peak as a local maximum or minimum and potentially initiate an increase in CPE. The logic of the present invention clips acceleration peak p2 to minimize the reflection significance from effecting CPE. The origin of the first peak reference value (dashed vertical line) is located at a percentage of the first peak value. Preferably, the anti-crash pulses are clipped to approximately half the previous positive peak size, however, other percentages will benefit from the present invention.

Acceleration peak p3 is in the crash direction and exceeds the ROW1_MAX_MIN level to again qualify for a minimum significant level. Where acceleration peak p3 increases above the first peak reference value, the CPE term (CPE 1) is increased because the energy is greater than p1 when considering the origin of p3 and the time interval between p1 and p3. That is, the origin of the first peak reference value is biased in the direction of the second peak. The apex of Acceleration peak p3 terminates the increase in the CPE term (CPE2) and again initiates a time limit ROW1_MAX_TIM_LIM ($TL_1$) for two consecutive maximums to effect CPE. That is, ROW1_MAX_TIM_LIM limits the effect to acceleration pulses that close together in time.

Acceleration peak p4 is in the anti-crash direction. Acceleration peak p5 is in the crash direction; exceeds the ROW1_MAX_MIN level; is of a higher level than acceleration peak p3; and is within time limit ROW1_MAX_TIM_LIM. Where acceleration peak p5 exceeds the level of acceleration peak p3 now initiates a further increase in the CPE term (CPE 3). The apex of Acceleration peak p5 terminates the increase in the CPE term (CPE4) and also initiates a second time limit ROW1_MAX_TIM_LIM ($TL_2$).

Acceleration peak p6 is in the anti-crash direction and Acceleration peak p7 is in the crash direction. Acceleration peak p7 does not exceed the ROW1_MAX_MIN level to qualify as a minimum significant level. CPE is therefore not increased.

Acceleration peak p8 is in the anti-crash direction and Acceleration peak p9 is in the crash direction. Acceleration peak p9 exceeds the ROW1_MAX_MIN level to again qualify for a minimum significant level. However, as acceleration peak p9 does not occur with the second time limit ROW1_MAX_TIM_LIM ($TL_2$) initiated at acceleration peak p5, CPE is not increased. The apex of Acceleration peak p9 does initiate a third time limit ROW1_MAX-TIM_LIM (t3).

Acceleration peak p10 is in the anti-crash direction and Acceleration peak p11 is in the crash direction. Where acceleration peak p11 exceeds the level of acceleration peak p9, a further increase in the CPE term (CPE 5) is initiated. The apex of Acceleration peak p11 terminates the increase in the CPE (CPE 6). Acceleration peak p11 does not qualify as a local maximum as the difference between acceleration peak p11 and p12 doe not exceed the ROW1_PEAK_DIFF limitation. Acceleration peak p11 therefore does not initiate another time limit ROW1_MAX_TIM_LIM.

Acceleration peak p12 is in the anti-crash direction and Acceleration peak p13 is in the crash direction. Where acceleration peak p13 exceeds the level of acceleration peak p11, a further increase in the CPE term (CPE 7) is initiated as Acceleration peak p13 does occur during the third time limit ROW1_MAX_TIM_LIM ($TL_3$). The apex of Acceleration peak p13 terminates the increase in the CPE (CPE 8).

FIG. 4 generally illustrates the primary cases where CPE is increased or not increased in response to measured accelerations. It should be understood that the increasing CPE term is preferably utilized to continuously increase the sensitivity threshold for an air bag deploy command and that depending upon other convention deploy logic factors, the air bag may have reached a predetermined deploy threshold deployed anywhere along the CPE graph of FIG. 4.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason, the following claims should be studied to determine the true scope and content of this invention.

What is claimed is:

1. A method of sensitizing an air bag deployment threshold comprising the steps of:
    (1) measuring a first acceleration;
    (2) measuring a second acceleration in a direction generally opposite the first acceleration;
    (3) measuring a third acceleration;
    (4) determining if the first acceleration exceeds a predetermined acceleration;
    (5) comparing the third acceleration to a reference value, the reference value having a magnitude origin biased in the direction of, and defined in part as a percentage of the second acceleration; and
    (6) increasing a crash-pulse energy term in response to the third acceleration increasing above the predetermined acceleration relative to the magnitude origin of said step (5).

2. A method as recited in claim 1, further comprising the step of:
    initiating a predetermined time period in response to said step (4) when a peak of the first acceleration is determined.

3. A method as recited in claim 1, further comprising the step of:
   setting the magnitude origin of the reference value to the greater of: 100 percent of the first acceleration; or a percentage of the first acceleration if the first acceleration is in an anti-crash direction.

4. A method as recited in claim 1, further comprising the step of:
   (7) initiating an increase in the crash-pulse energy term in response to the third acceleration increasing above the second acceleration.

5. A method as recited in claim 1, further comprising the step of:
   (7) terminating the increase in the crash-pulse energy term in response to detecting a peak of the third acceleration.

6. A method as recited in claim 1, further comprising the step of:
   identifying the crash-pulse energy term reaching a predetermined value; and
   deploying an air bag in response to the crash-pulse energy term reaching the predetermined value.

7. A method as recited in claim 1, further comprising the step of:
   increasing a sensitivity of an airbag deploy command in response to an increase in the crash-pulse energy term.

8. A method as recited in claim 1, further comprising the step of:
   increasing the likelihood of an airbag deploy command in response to an increase in the crash-pulse energy term.

9. A method as recited in claim 1, wherein the first, second and third acceleration are in a lateral vehicle direction.

10. A method as recited in claim 1, further comprising the step of:
    setting the magnitude origin of the reference value to 100 percent of the first acceleration.

11. A method of sensitizing an air bag deployment threshold comprising the steps of:
    (1) measuring a first acceleration;
    (2) determining whether the first acceleration exceeds a predetermined acceleration;
    (3) measuring a second acceleration, the second acceleration in a direction generally opposite the first acceleration;
    (4) measuring a third acceleration, the third acceleration in a direction generally the same as the first acceleration;
    (5) comparing the third acceleration to a reference value, the reference value having a magnitude origin biased in the direction of, and defined in part as a percentage of the second acceleration; and
    (6) increasing a crash-pulse energy term in response to the third acceleration increasing above the predetermined acceleration relative to the magnitude origin of said step (5).

12. A method as recited in claim 11, further comprising the step of:
    increasing the crash-pulse energy term only in response to said step (6) occurring within a predetermined time period.

13. A method as recited in claim 11, further comprising the step of:
    increasing the likelihood of a side airbag deploy command in response to an increase in the crash-pulse energy term.

14. A method as recited in claim 11, further comprising the step of:
    setting the magnitude origin of the reference value to the greater of: 100 percent of the first acceleration; or a percentage of the first acceleration if the first acceleration is in an anti-crash direction.

15. A method as recited in claim 11, further comprising the step of:
    terminating the increase in the crash-pulse energy term in response to identifying a peak in the third acceleration.

16. A method as recited in claim 15, further comprising the step of:
    initiating a time period in response to identifying a peak in the third first acceleration.

17. A method as recited in claim 11, further comprising the step of:
    increasing the likelihood of an airbag deploy command in response to an increase in the crash-pulse energy term.

* * * * *